March 20, 1956 S. CUTLER ET AL 2,738,758

ESCUTCHEON DIAL

Filed Sept. 18, 1953 2 Sheets-Sheet 1

STANLEY CUTLER
GRANT C. ADAMS
INVENTORS

BY Hazard & Miller

ATTORNEYS

March 20, 1956 S. CUTLER ET AL 2,738,758
ESCUTCHEON DIAL
Filed Sept. 18, 1953 2 Sheets-Sheet 2

STANLEY CUTLER
GRANT C. ADAMS
INVENTORS

BY Hazard & Miller
ATTORNEYS

United States Patent Office 2,738,758 Patented Mar. 20, 1956

2,738,758

ESCUTCHEON DIAL

Stanley Cutler and Grant C. Adams, Van Nuys, Calif., assignors to Pacific Mercury Television Mfg. Corp., Van Nuys, Calif., a corporation of California Application September 18, 1953, Serial No. 380,988

4 Claims. (Cl. 116—124.4)

This invention relates to improvements in dial controls, and is particularly designed for use upon television receiving sets.

Explanatory of the present invention, television receiving sets heretofore conventionally manufactured have been equipped with tuners capable of being tuned to receive from twelve different stations on twelve different frequencies of V. H. F. Consequently, the control dial which rotates and adjusts the tuner has been conventionally equipped with twelve usually equally spaced numbers running from two through thirteen, inclusive. Additional channels have recently been authorized from fourteen to eighty-two, inclusive, U. H. F.

It is a primary object of the present invention to provide a dial control mechanism for the tuner of a television receiving set wherein one dial that is operatively connected to the tuner has a circular row of equally spaced figures running from two to thirteen, inclusive, so that by the adjustment of this dial any of the channels from two through thirteen may be selected in the conventional manner. In association with this dial there is a second concentric row of figures running from zero through nine, inclusive. Coaxially arranged with respect to the mentioned dial there is a second dial which is independently rotatable with respect to the first dial and which has disposed thereon a circular row of figures running from one through eight, inclusive, and also a symbol, the intention being that by combining one of the figures on the second dial with one of the figures on the second row on the first dial that any of the channels from fourteen through eighty-two may be optionally selected. All of the figures and the symbol on the two dials are light-transmitting, and in association with the dials there is a light source. This light source is so arranged that when the set is tuned to one of the channels two to thirteen inclusive, the light will pass through the figure of the selected channel and also through the symbol which indicates that the channel selected is V. H. F. In adjusting the set, however, to one of the channels fourteen through eight-two inclusive, the light from the light source is shielded from passing through any of the figures two through thirteen inclusive, and is caused to pass through one of the figures on the second dial and one of the figures in the second row on the first dial. In this manner, as only one figure on each of the two dials is illuminated, an indication is made that the set is adjusted to receive from a channel of U. H. F. This is confirmed by the lack of illumination of the symbol for V. H. F.

It will be apparent from the above-described arrangement that it is possible to combine the figure one on the second dial with either of the figures zero, one, two, or three of the second row on the first dial, and that this would indicate channel ten, eleven, twelve, or thirteen U. H. F., whereas these figures are already present in their combined form on the first row of the first mentioned dial.

To avoid any resulting confusion, it is another object of the invention to provide a dial turning knob combination wherein the zero on the second row on the first dial is opposite the figure ten on the first dial, and similarly the figure one of the second row on the first dial is opposite the figure eleven, two is opposite twelve, and three is opposite thirteen. Consequently, with this arrangement it is possible by means of a switch and appropriate connections in the tuner to have the tuner function on the V. H. F. setting of the first dial for channels ten, eleven, twelve, and thirteen even though the two dials are set for channels ten, eleven, twelve, and thirteen U. H. F.

With the foregoing and other objects in view, which will be made manifest in the following detailed description and specifically pointed out in the appended claims, reference is had to the accompanying drawings for an illustrative embodiment of the invention, wherein:

Figure 1:
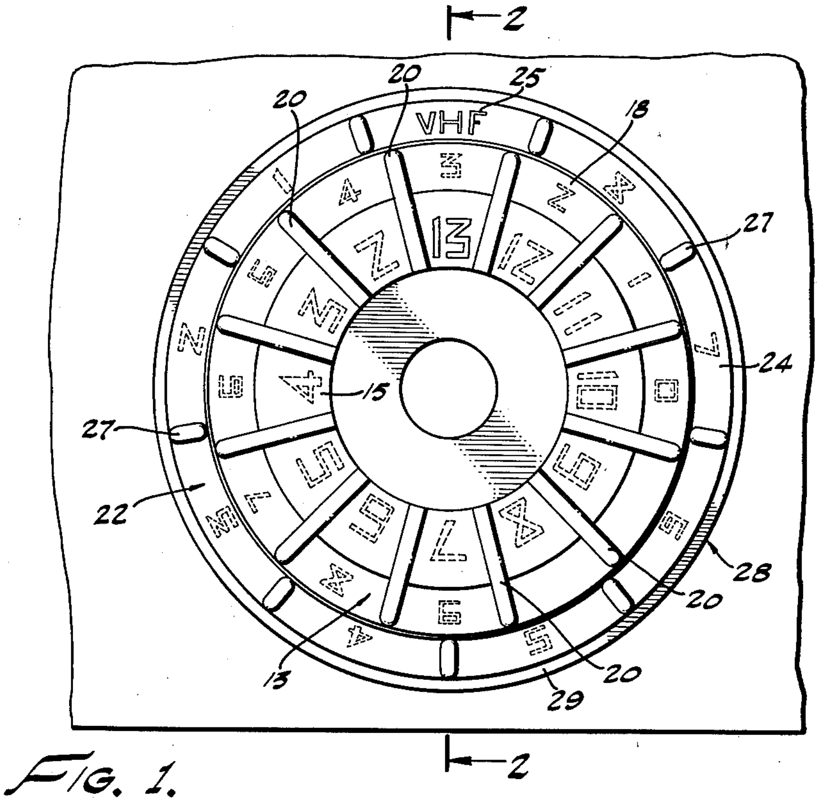
Figure 1 is a front view in elevation of a dial tuning knob combination for television receiving sets embodying the present invention.
Figures 4, 5:
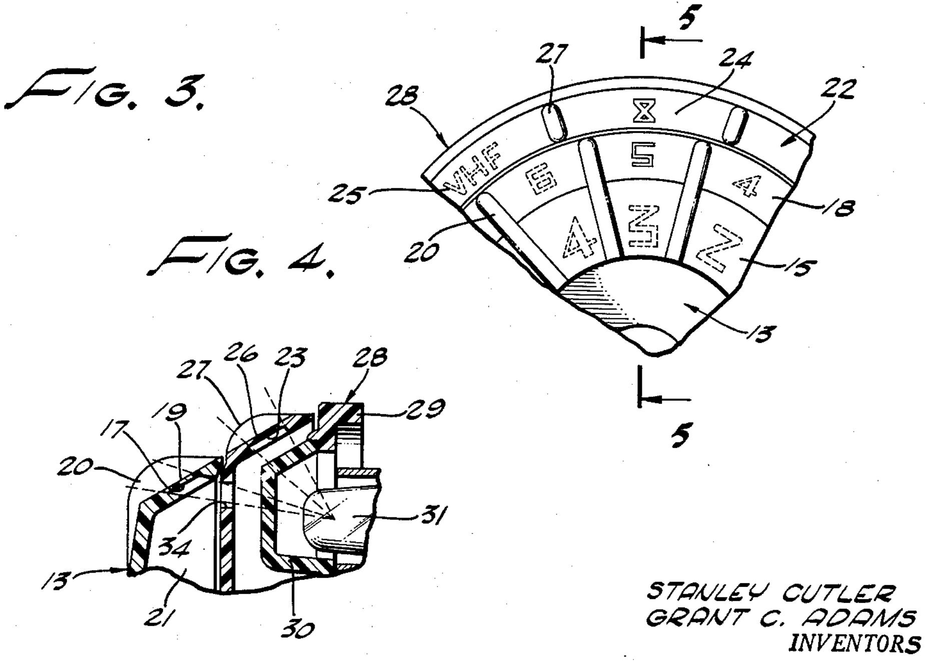

Fig. 4 is a partial view similar to Fig. 1, but illustrating a setting of the two dials for U. H. F. reception; and Fig. 5 is a partial view in vertical section taken substantially upon the line 5—5 upon Fig. 4.

Figure 2:
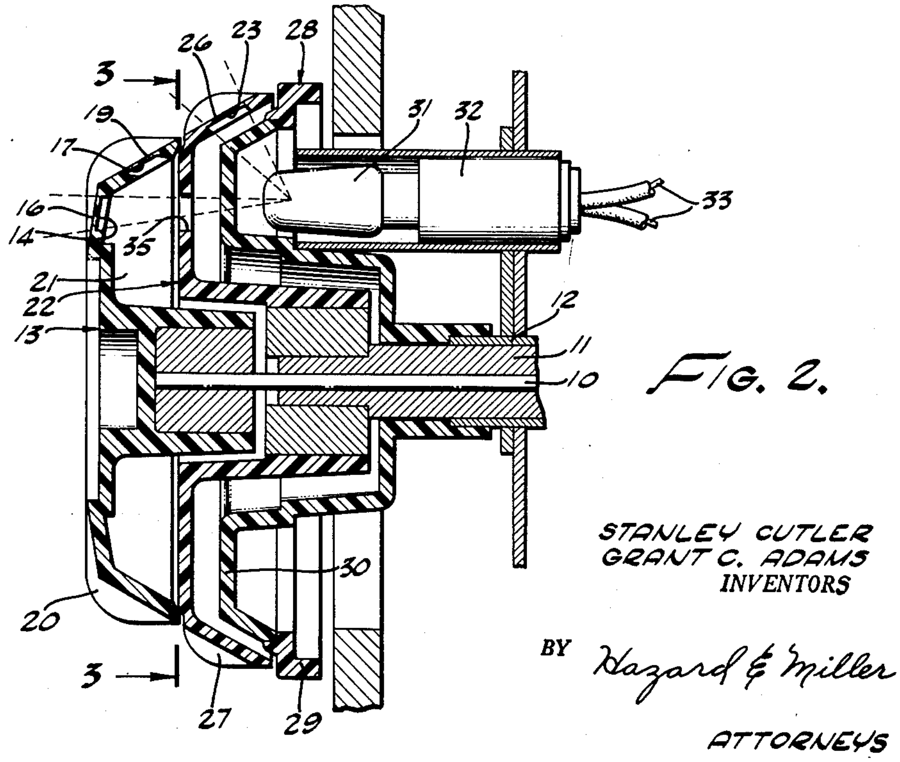
Fig. 2 is a vertical section taken substantially upon the line 2—2 upon Fig. 1.

Referring to the accompanying drawings wherein similar reference characters designate similar parts throughout, the tuner for the television which is not shown on the drawing, is rotatably adjusted by means of three coaxial shafts indicated on Fig. 2 by the reference characters 10, 11, and 12. The shaft 10 on rotation adjusts the tuner to any one of the twelve positions required for reception of channels two through thirteen inclusive V. H. F. The shaft or sleeve 11 adjusts the tuner to any one of the tens of channels one through eight inclusive. The third shaft or sleeve 12 is operatively connected to the tuner to secure fine tuning or fine adjustment. As the digits for channels 14 through 82, inclusive, are located on the same dial as the numbers two through thirteen, it is obvious that the shaft 10 must also be operatively connected to the tuner to secure the digit adjustment for channels fourteen through eighty-two inclusive, U. H. F.

On the forward end of the shaft 10 there is mounted a circular dial 13 preferably formed of a synthetic resin plastic which is generally opaque to the passage of light except where the plastic is of quite thin cross section. Other materials may be used in lieu of the synthetic resin plastic if desired. On the back of this dial there is a row of molded recesses 14 which are of the shapes of the numerals two to thirteen inclusive. These numerals are arranged in an inner row about the axis of rotation of the dial, such row being indicated by the reference character 15. These recesses cause the portions of the dial in front of them to be of relatively thin cross section as indicated at 16, the cross section being thin enough so that light from a light source may be transmitted therethrough. About the inner row 15 of the figures there is an outer row of recesses indicated at 17. These recesses are of shapes to provide an outer row 18 of figures on the dial 13 which figures run from zero to nine, inclusive. The recesses 17 also provide thin sections 19 which are capable of transmitting light from the light source. As will be noted from an inspection of Fig. 1, the figures zero, one, two, and three of the outer row are arranged opposite the figures ten, eleven, twelve, and thirteen of the inner row 15. On the exterior of the dial 13 there may be radial ribs 20 which facilitate the rotation of this dial, and consequently, the shaft 10 and the operative part of the tuner to which the shaft is connected. Immediately behind these ribs there may be radial partitions 21 which tend to confine the light from the light source to either a single figure of the row 15 or a single figure of the row 18 so that when the figure 13 is illuminated for example, no stray light will illuminate the adjoining figures two or twelve.

On the forward end of the sleeve or shaft 11 there is mounted a second dial 22. This dial is arranged immediately behind the first dial 13 and preferably is so shaped as to smoothly conform to its general configuration. On this dial which may likewise be formed of an opaque synthetic resin plastic which is opaque except where its section is quite thin, there is a row of recesses 23 molded to conform to the shapes of the figures one through eight, inclusive. This row is indicated by the reference character 24. As part of this row, one of the recesses 23 is shaped to provide a symbol such symbol being indicated by the reference character 25. This symbol may consist of the letters V. H. F. to indicate very high frequency. The recesses cause the dial 22 to have thin sections as indicated at 26 forwardly of the recesses so that these thin sections are also capable of transmitting light from the light source. On the exterior of the dial there may be radially arranged ribs 27 to facilitate manual rotation of the dial and consequently the second shaft 11. Behind the second dial 22 there is a third dial or disc 28 which is connected to the third shaft or sleeve 12. This disc has an exposed rim so that it may be manually rotated and consequently rotate the sleeve 12 to secure fine adjustment or fine tuning. The disc 28 is preferably formed of two parts, that is an outer rim 29 which is of opaque material and an inner part 30 which is preferably of transparent material. Behind the disc 28 there is a light source 31 preferably in the form of an electric lamp mounted within a socket 32 that is supplied with electric current through conductors 33. This light source is arranged at a definite location with respect to the dials, such as for example, it may be located directly behind the topmost portions of the two dials 13 and 22.

Figure 3:
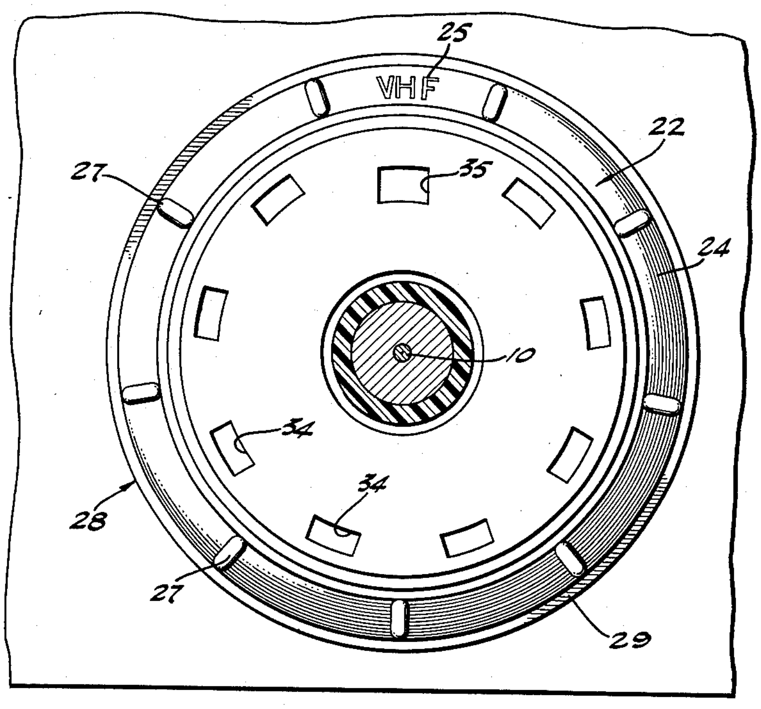
Fig. 3 is a vertical section taken substantially upon the line 3—3 upon Fig. 2.

In the dial 22, as shown on Fig. 3, there are window openings 34. Such window openings are opposite each of the figures of the second row 18 on the dial 13. There is also a single window opening 35 arranged immediately beneath the symbol 25 of the second dial. The window opening 35 is so arranged that when the symbol 25 on the second dial is uppermost the window 35 will permit light from the light source 31 to pass through the second dial and through one of the figures 15 of the first row on the first dial. Consequently, if the dials are adjusted to the position shown in Fig. 1, light from the light source may pass directly through the transparent portion of disc 28 and through the thin section 26 of the symbol 25. It may also pass from the light source 31 through the window 35 and illuminate the uppermost figure of the inner row 15 which is illustrated as being the figure thirteen. Light from the light source is shielded from the uppermost figure of the row 18 on the first dial. Consequently, with this setting the symbol 25 is illuminated and a figure of the row 15 on the first dial. As long as the second dial 22 retains the setting wherein the symbol V. H. F. is illuminated, rotation of the first dial 13 merely brings about a tuning and a selection of one of channels two to thirteen inclusive. However, when the second dial 22 is rotated so as to displace the symbol 25 from its uppermost position the window 35 is displaced from its position in front of the light source, and one of the windows 34 is positioned in front of the light source. This permits light from the light source 31 to pass through a window 34 to its associated figure on the row 18. Consequently, under these circumstances the symbol 25 will no longer be illuminated, indicating that the tuning is for U. H. F.

and one of the figures of row 24 and one of the figures of the row 18 will be simultaneously illuminated. Thus, if the second dial 22 is adjusted so that the figure seven is uppermost and the first dial is adjusted so that the figure four is uppermost, these two figures will be simultaneouly illuminated and will indicate that the tuner has been adjusted for reception on channel 74.

It will, of course, be observed that it is possible to have the figure one of the row 24 on the second dial uppermost and either of the figures zero, one, two, or three of the outer row 18 on the first dial uppermost. Such an association of figures would indicate that the tuner has been adjusted for reception on channels ten, eleven, twelve, or thirteen U. H. F. Actually, however, although this indication may be made on the dials by properly connecting and incorporating a switch on the tuner, this setting of the dials causes the tuner to be adjusted for reception on channels ten, eleven, twelve, or thirteen, respectively, V. H. F.

It will be appreciated that with the above arrangement of dials and light source that a compact, neat, and attractive tuning knob for the tuning shafts of the tuner of a television receiving set has been provided which can be easily manipulated and adjusted so that optionally any of the channels two to thirteen V. H. F. may be received or any of the channels fourteen through eighty-two may be received.

The invention has been described in connection with the use of channels fourteen to eighty-two U. H. F. as this is the present number of channels which have been allocated. It is apparent, however, that should additional channels be allocated that the second dial 24 may have the number of figures displayed thereon increased above eight, and under such circumstances the number of windows 34 in the second dial would similarly have to be increased.

While the illuminatable figures and symbols on the two dials have been provided by molding recesses on the rear sides thereof to produce thin translucent sections 17 and 26, it is apparent that other means of making the figures and symbol illuminatable may be employed. For example, the dials 13 and 22 may be formed of opaque material and have transparent or translucent numerals and letters set therein. Or in the alternative, each of the dials may be formed of transparent or translucent material and merely coated with an opaque coating except around areas shaped in conformity with the figures and the symbol.

Another suitable construction that can be used is to have each figure and symbol formed of opaque material disposed on a transparent or translucent background. Any contrasting arrangement between the symbols and numerals and the background on which they are disposed may be employed.

It will be appreciated by those skilled in the art that there is herein disclosed a combination of knobs and light source for V. H. F./U. H. F. tuners for television receiving sets capable of indicating selectively the finite and exact numbers identifying any and every television channel from two through eight-two inclusive. This is done in such a manner that there is no simultaneous display or disclosing of the presence of other numbers corresponding to any other channel. Consequently, due to the selectively of the display of the selected channel the knob arrangement is such that it is very easy to read and to effect an adjustment.

Various changes may be made in the details of construction without departing from the spirit and scope of the invention as defined by the appended claims.

We claim:

1. In combination, first and second rotatable dials coaxially arranged, the first dial having two concentric rows of light transmitting figures thereon, and the second dial having a row of light transmitting figures thereon concentrically arranged with respect to the rows of figures on the first dial, a light source behind the dials, and window means on the second dial for causing the light from the light source to pass through a figure on the second dial and through a figure on one or the other, but not both, of the rows of the first dial.

2. In combination, first and second independently rotatable dials coaxially arranged, the first dial having two concentric rows of light transmitting figures thereon, one of which rows runs from two to thirteen inclusive, and the other of which runs from zero to nine, inclusive, the zero, one, two, and three of the latter row being arranged opposite the ten, eleven, twelve, and thirteen, respectively, of the first mentioned row, the second dial having a row of light transmitting figures and a symbol thereon arranged concentrically with the mentioned rows of figures on the first mentioned dial, a light source behind the dials, and window means on the second-mentioned dial arranged so that when the symbol is in a predetermined position light from the light source may only pass therethrough and through one of the figures of the first mentioned row and when the symbol is displaced from said position light from the light source may pass through a figure on the second-mentioned dial and through a figure of the second row but not a figure of the first-mentioned row on the first dial.

3. In combination, first and second independently rotatable dials coaxially arranged, the first dial having two concentric rows of light transmitting figures thereon, one of which rows runs from two to thirteen inclusive, and the other of which runs from zero to nine, inclusive, the zero, one, two, and three of the latter row being arranged opposite the ten, eleven, twelve, and thirteen, respectively, of the first-mentioned row, the second dial having a row of light transmitting figures and a symbol thereon arranged concentrically with the mentioned rows of figures on the first-mentioned dial, a light source behind the dials, the second dial inwardly of the figures thereon being opaque except for window openings therein, one window opening being arranged inwardly of the symbol and arranged to allow light from the light source to pass to the figures of the first-mentioned row, and window openings arranged inwardly of the figures on the second dial and arranged when opposite the light source to allow light to pass to figures of the first-mentioned row.

4. A dial construction for tuners of television receiving sets having a shaft adapted upon rotation to tune the set for channels two to thirteen inclusive, and a sleeve thereabouts adapted to adjust the tuner to tens of channels fourteen to eighty-two inclusive comprising a dial mounted on the shaft having two concentric rows of light transmitting figures thereon, a second dial mounted on the sleeve having a single row of figures and a symbol which are also light transmitting, a light source behind both dials, said second dial having a window arranged in conjunction with the symbol and arranged to permit light from the light source to pass through a figure of one of the rows on the first dial while light is also illuminating the symbol, said second dial having other windows therein arranged to permit light from the light source to pass through figures of the second row on the first dial and through the figures on the second dial when the position of the symbol has been displaced.

References Cited in the file of this patent

UNITED STATES PATENTS

| | | |
|---|---|---|
| 1,427,760 | Ridge | Aug. 29, 1922 |
| 2,067,871 | Booth | Jan. 12, 1937 |
| 2,446,433 | Putnam | Aug. 3, 1948 |
| 2,541,892 | Schulze | Feb. 13, 1951 |